(12) United States Patent
Butt et al.

(10) Patent No.: US 7,433,942 B2
(45) Date of Patent: Oct. 7, 2008

(54) NETWORK MANAGEMENT

(75) Inventors: Alan B. Butt, Orem, UT (US); Gregory P. Olsen, Lindon, UT (US); Richard R. Winterton, Provo, UT (US); David A. Eatough, Herriman, UT (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 09/796,722

(22) Filed: Feb. 27, 2001

(65) Prior Publication Data

US 2002/0120672 A1   Aug. 29, 2002

(51) Int. Cl.
G06F 15/173 (2006.01)
G06F 15/16 (2006.01)

(52) U.S. Cl. .................. 709/223; 709/202; 709/224; 709/206

(58) Field of Classification Search .......... 709/202, 709/236, 224, 230, 223, 206; 455/12.1; 370/257; 707/10
See application file for complete search history.

(56) References Cited

U.S. PATENT DOCUMENTS

| | | | | |
|---|---|---|---|---|
| 4,748,620 A | * | 5/1988 | Adelmann et al. | 370/394 |
| 5,481,735 A | * | 1/1996 | Mortensen et al. | 709/246 |
| 5,611,050 A | * | 3/1997 | Theimer et al. | 709/202 |
| 5,686,902 A | * | 11/1997 | Reis et al. | 340/10.2 |
| 5,854,901 A | * | 12/1998 | Cole et al. | 709/245 |
| 5,898,681 A | * | 4/1999 | Dutta | 370/229 |
| 5,915,095 A | * | 6/1999 | Miskowiec | 709/223 |
| 5,968,116 A | * | 10/1999 | Day et al. | 709/202 |
| 6,009,274 A | * | 12/1999 | Fletcher et al. | 717/173 |
| 6,032,175 A | * | 2/2000 | Fletcher et al. | 709/200 |
| 6,052,727 A | * | 4/2000 | Kamalanathan | 709/224 |
| 6,122,483 A | * | 9/2000 | Lo et al. | 455/12.1 |
| 6,134,692 A | * | 10/2000 | Sekiya et al. | 714/749 |
| 6,182,075 B1 | * | 1/2001 | Hsu | 707/10 |
| 6,249,814 B1 | * | 6/2001 | Shaffer et al. | 709/223 |
| 6,269,099 B1 | * | 7/2001 | Borella et al. | 370/389 |
| 6,269,400 B1 | * | 7/2001 | Douglas et al. | 709/224 |
| 6,457,059 B1 | * | 9/2002 | Kobayashi | 709/242 |
| 6,466,549 B1 | * | 10/2002 | Hattig | 370/254 |
| 6,496,859 B2 | * | 12/2002 | Roy et al. | 709/223 |
| 6,546,046 B1 | * | 4/2003 | Sweitzer et al. | 375/225 |
| 6,556,541 B1 | * | 4/2003 | Bare | 370/235 |
| 6,633,909 B1 | * | 10/2003 | Barrett et al. | 709/224 |
| 6,636,499 B1 | * | 10/2003 | Dowling | 370/338 |
| 6,671,746 B1 | * | 12/2003 | Northrup | 719/331 |
| 6,721,286 B1 | * | 4/2004 | Williams et al. | 370/282 |
| 6,751,672 B1 | * | 6/2004 | Khalil et al. | 709/230 |

(Continued)

OTHER PUBLICATIONS

U.S. Appl. No. 60/263,573, filed Jan. 22, 2001, Slaughter et al.

(Continued)

*Primary Examiner*—John Follansbee
*Assistant Examiner*—Kristie D Shingles
(74) *Attorney, Agent, or Firm*—Fish & Richardson P.C.

(57) ABSTRACT

A method for discovering agents operative on devices configured in a network by broadcasting discovery messages having a common format and containing data to the network devices and receiving reply messages having the same common format and containing data from the agents, and permitting new types of data within the messages without changing the common format.

41 Claims, 8 Drawing Sheets

U.S. PATENT DOCUMENTS

| | | | |
|---|---|---|---|
| 6,801,507 B1 * | 10/2004 | Humpleman et al. | 370/257 |
| 6,810,259 B1 * | 10/2004 | Zhang | 455/456.5 |
| 6,922,396 B1 * | 7/2005 | Knappe | 370/252 |
| 6,987,739 B2 * | 1/2006 | Kitazawa et al. | 370/252 |
| 6,993,499 B2 * | 1/2006 | Gagnon et al. | 705/26 |
| 7,006,525 B1 * | 2/2006 | Jha | 370/466 |
| 7,007,062 B1 * | 2/2006 | Serenyi et al. | 709/203 |
| 7,065,579 B2 * | 6/2006 | Traversat et al. | 709/230 |
| 7,085,814 B1 * | 8/2006 | Gandhi et al. | 709/208 |
| 2001/0044822 A1 * | 11/2001 | Nishio | 709/202 |
| 2002/0090952 A1 * | 7/2002 | Cantwell | 455/456 |
| 2002/0107939 A1 * | 8/2002 | Ford et al. | 709/218 |
| 2002/0146985 A1 * | 10/2002 | Naden | 455/70 |
| 2003/0095504 A1 * | 5/2003 | Ogier | 370/235 |

OTHER PUBLICATIONS

U.S. Appl. No. 60/268,893, filed Feb. 14, 2001, Slaughter et al.

* cited by examiner

NETWORK MANAGEMENT

TECHNICAL FIELD

This invention relates to network management.

BACKGROUND

Examples of client-server networks include local area networks (LANS), wide area networks (WANS), global networks (Internet), and the networking of telecommunications devices (e.g., cellular networks, personal communication services (PCS) networks, wireline telephony networks). Although it may appear to an end-user that the network is indifferent to computer type (e.g., Intel®-based PC, a Macintosh, or a UNIX system), the user interface to the network protocols providing the communication interface among heterogeneous computer systems relies on the host operating system (OS) to produce a seemingly transparent network.

For controlling the operation of a computer network, it is common to provide network management devices for discovering and collecting information from different types of networked computers and transferring files to and from remote systems. One such network management device is disclosed in U.S. Pat. No. 5,968,116 (issued Oct. 19, 1999) (the "'116 patent") and incorporated by reference.

DETAILED DESCRIPTION

Figure 1:
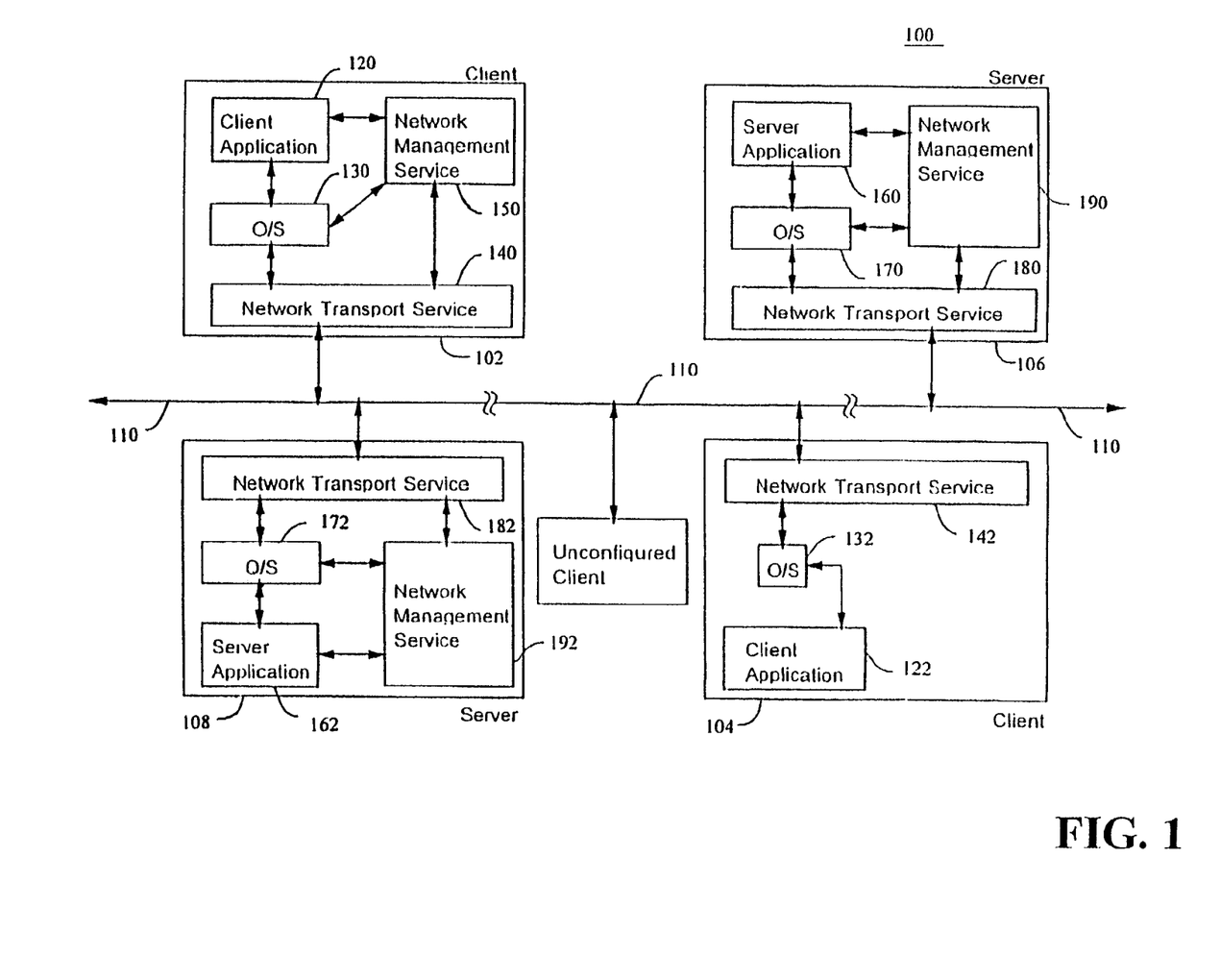
FIG. 1 is a block diagram of a network.

In FIG. 1, clients 102 and 104 and servers 106 and 108 are interconnected by a network medium 110. Clients 102 and 104 could be personal computer systems or telecommunication network devices, for example. Network medium 110 could be any networking infrastructure, including network cables and their associated switching (routing), repeater, and/or delay elements, suitable for a high speed local area network (LAN), or a slower speed wide area network (WAN), or public network (e.g., the Internet). The term server includes but is not limited to a "file" server or an "application" server.

In some examples, clients 102 and 104 include client application(s) 120 and 122, client operating systems (OS) 130 and 132, and network transport services 140 and 142 (sometimes referred to as the transport layer), connected as shown. Client 102 also includes network management service 150.

Client applications 120 and 122 are intended to represent a wide variety of applications, for example, management applications such as Client Manager and Work Group Manager, available from Intel Corp., of Santa Clara, Calif. Client applications 120 and 122 rely on operating systems 130 and 132, respectively, to interface with network transport services 140 and 142 and, ultimately, with network medium 110. Client application 120 could instead interface with network medium 110 through network management service 150 and network transport service 140. Similarly, operating systems 130 and 132 are intended to represent a wide variety of operating systems common to a corresponding variety of computing platforms. Examples of such operating systems include the UNIX operating system, LINUX operating systems, Windows™-based operating systems (e.g., Windows™ 3.1, Windows™ 95/98, Windows™ 2000, Windows™ NT and Windows™ CE), the Macintosh™ and NeXTStep™ operating systems.

In addition to clients 102 and 104, network 100 also includes servers 106 and 108, which include server applications 160 and 162, server operating system 170 and 172, network transport services 180 and 182, and network management services 190 and 192. Server applications 160 and 162 and operating systems 170 and 172 could be any application and operating system, respectively. Internet Protocol (IP) environments are now very common and other protocols are now increasingly rare. Accordingly, network transport devices 140, 142, 180, and 182 are intended to represent only one communication protocol. For example, the protocol could be IP or, alternatively, any protocol common to all network elements of network 100. On the other hand, network management services 150, 190 and 192, as discussed in more detail below, include services which enable, for example, network management applications to interact with network elements independent of the hardware included in the elements and the operating systems resident on those network elements.

Figure 2:
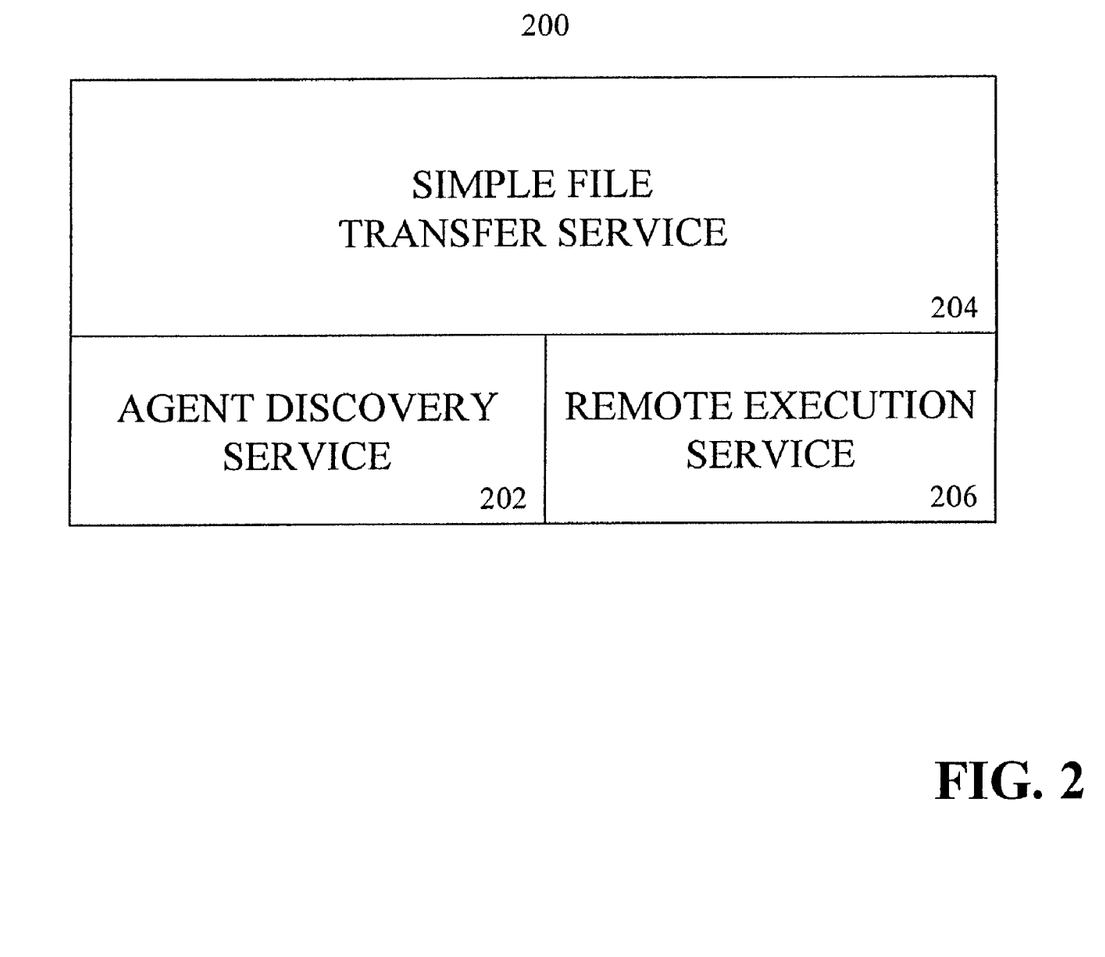
FIG. 2 is a block diagram of a network management service.

In one example, shown in FIG. 2, network management service 200 includes agent discovery service 202, simple file transfer service 204, and remote execution service 206. Each of the respective elements of network management service 200, and their corresponding communication protocols is described in detail in the '116 patent. In brief, network management service 200 enables a client to discover remote network management applications (e.g., "agents"), communicate with remote agents, transfer files to and from remote network devices, and remotely initiate local execution of applications on the client, independent of the particular type of operating system(s) operating on the client computer. Invocation of the services offered by the network management service may be accomplished any number of ways, including one or more application program interfaces (API's).

In one example, network management service 200, shown in FIG. 2, includes agent discovery service 202. Agent discovery service 202 enables network management service 200 to discover and register remote agents and allows local agents to be discovered and remotely registered. The remote agents may be agents residing on remote clients or remote servers. Agent discovery service 202 initiates the discovery process by broadcasting a packet (or datagram) of information on network 100 over network medium 110. The packet of information is sometimes referred to as a PING packet. Discovery services of like kind, on behalf of remote agents disposed to discovery (i.e., "listening" for PING packets), respond to the received PING packet with a similar packet of information, (e.g., a PONG packet), via network 100. The responding discovery service may or may not be part of a network management agent. Agent discovery service 202 receives the responses and processes them in a appropriate manner.

Agent discovery service 202 also maintains lists of discovered remote agents. For example, network management service 190, shown in FIG. 1, could include agent discovery service 202 as described above. Server application 160 could instruct network management service 190 to discover remote agents and update a list of discovered remote agents accordingly. Alternatively, network management service 190 autonomously discovers remote agents using agent discovery service 190 and updates the discovered list.

In one example, network management service 200, shown in FIG. 2, includes simple file transfer service 204 for copying or moving files from a network element, across a network to a second network element. For example, files may be "pushed" (e.g., from client 102 to server 106) or "pulled" (e.g., from server 106 to client 102) using a pair of simple file transfer services 204 disposed in a client and a server, respectively. Alternatively, simple file transfer service 204 unilaterally identifies and retrieves a file from a remote agent. A listing (e.g., a directory) of the files available on a remote agent may also be obtained by simple file transfer service 204 in addition to the files themselves. Communication for the simple file transfer service 204 may be performed on dynamic UDP/IP ports or a fixed socket/port may be assigned.

In addition to its agent discovery service 202 and file transfer service 204 elements, network management service 200 of FIG. 2, for example, includes remote execution service 206. Remote execution service 206 of network management service 200 locally initiates remote execution of an application, as well as remotely initiates local execution of an application. For example, remote execution services 206 incorporated into network management service 150 disposed on client 102 and network management service 190 disposed on server 106, as shown in FIG. 1, cooperate to facilitate a server to respond to a client (or vice versa, or among clients, or among servers) to initiate execution of a file.

The components of network management service 200, as implemented, for example, on network management services 150, 190 and 192, perform their tasks through network transport services 140, 142, 180, and 182, shown in FIG. 1, by sending and receiving packets of information over network medium 110. Networks are commonly composed of clients and servers using different types of operating systems and hardware, yet relying only on IP as a communication protocol. Thus, in one example, network management service 200 operates without a component for translating between different communication protocols.

Network management service 200 relies on sending packets of information across a network of computers to accomplish tasks. The packets may contain several types of data or instructions depending on the particular function that must be accomplished. The network management service described in the '116 patent used several datagram formats for identifying the data contained within each packet depending on the purpose of the packet (e.g., transferring files of remotely executing applications). The datagram formats of the '116 patent include fields describing characteristics of a packet and the data within it. That datagram format begins with several fields each describing a characteristic of the packet (e.g. version, type of data within packet, size, client information, server information, and data size, and concludes with a field containing data). However, adding new data to an already existing datagram structure is difficult when trying to remain backwards compatible. An agent discovery service is particularly susceptible to compatibility issues as the variety of data that could be discovered increases with advances in technologies associated with networks of devices.

In some examples, agent discovery service 202 of network management service 200 sends and receives packets having a format that does not limit the type of data that may be sent and received. In other examples, network management service 200 could use the substantially the same format whether it is discovering remote agents, transferring files, executing remote applications, or performing other functions. The format could be used whether broadcasting messages, performing a directed broadcast of messages, or sending a single message using a point-to-point protocol.

Figure 3A:
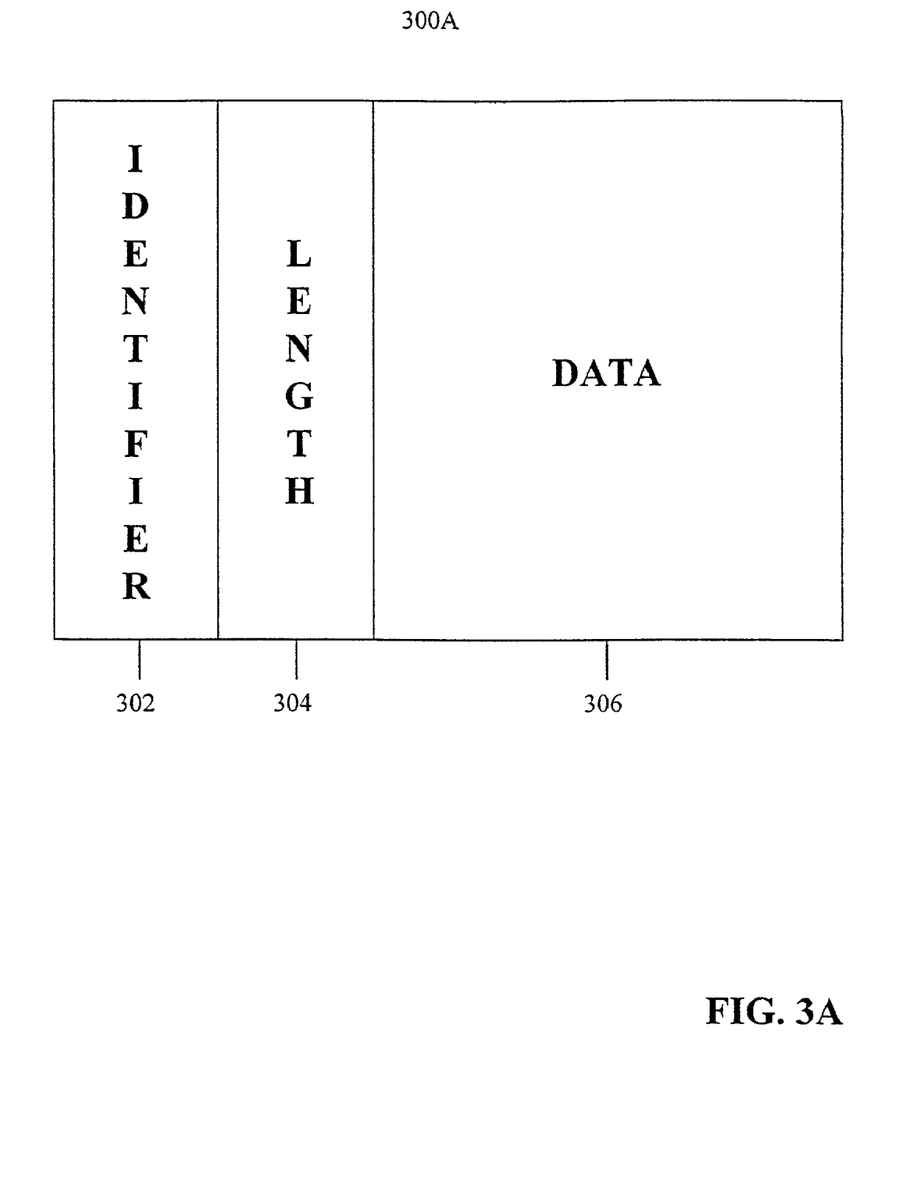
FIG. 3A is a block diagram of a tagged, variable-length data block.

In one example, agent discovery service 202 sends and receives packets of information that could contain one or more data blocks 300A, shown in FIG. 3A. Data block 300A could include tag field 302, size field 304, and data field 306. Tag field 302 could contain a four-byte code identifying the type of data in data field 306. Similarly, the code within tag field 302 of data block 300A could represent a command sent or received by network management service 200. Agent discovery service 202 includes a list of known tag codes. Agent discovery service 202 is simplified because new codes can be added to the list as new types of data and new commands are sent and received using data block 300A. When agent discovery service 202 receives a data block with an unknown code in tag field 302, the data block is ignored. Size field 304 contains a two-byte number representing the size of the data to follow in data field 306. In other examples, file transfer service 204, remote execution service 206, or both could use data block 300A to perform their respective functions by using additional tag codes in a manner similar to that described above.

Figure 3B:
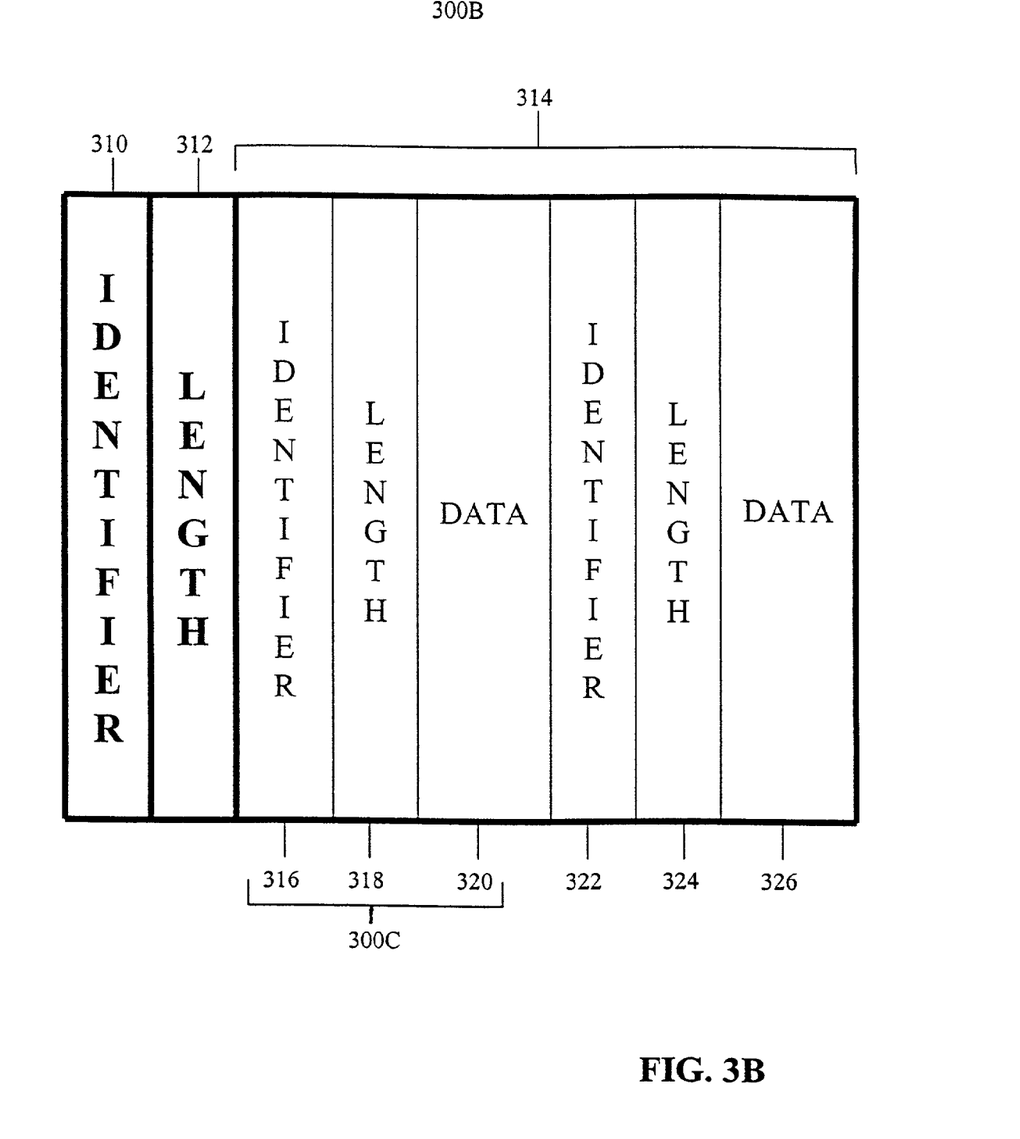
FIG. 3B is a block diagram of nested, tagged, variable-length data blocks.

In some examples, agent discovery service 202 could send and receive packets containing one or more data blocks 300A nested within a single data block 300B, as shown in FIG. 3B. Data block 300B could include tag field 310, size field 312, and data field 314. In one example, data field 314 contains two data blocks having identifier fields 316 and 322, length fields 318 and 324, and data fields 320 and 326. In other examples, additional data blocks could be nested within data fields 320, 326 or any data field of a data block nested within data field 314. Nesting of data blocks allows individual pieces of data to replace the use of hard coded data formats, as described above in the '116 patent for example. Thus, data blocks could be added or removed from a message without affectng the functionality of agent discovery service 202.

In some examples, nesting data blocks within data blocks could be used by agent discovery service 202 to organize the handling of multiple discovery requests.

In one example, one or more applications could call upon agent discovery service 202 to make multiple, overlapping discovery requests wherein replies from each request are received in some mixed sequence. For each received reply, agent discovery service 202 may have to call one or more callback functions for every reply it receives. While performing listening and reply functions, an agent discovery service may receive several different discovery requests from different discovery services before replying to any.

In some examples, agent discovery service 202, when performing its discovery function, builds discovery messages with nested data blocks containing instance data, such as data block 300C for example. When performing listening and reply functions, agent discovery service 202 identifies the instance data in a received discovery message by its tag. Agent discovery service 202 then copies data block 300C into its reply message and, in due course, sends the reply. When receiving discovery replies, agent discovery service 202 uses the instance data in data block 300C to identify the corresponding discovery request for the reply and the appropriate callback functions to be performed. In one example, instance data is used only by agent discovery service 202 and is not known to the discovering application.

In another example, an application could initiate several discovery requests and require agent discovery service 202 to make the same callback function for each. In this example, the application would need some way to identify for which discovery requests each reply was made.

In some examples, an application could supply agent discovery service 202 with application instance data to include within a discovery request, such as within nested data block 300C for example. The application instance data could be anything the application needed to identify and keep track of the replies to several different discovery requests. As described above for instance data, agent discovery service 202 performing listening and reply functions could simply copy data block 300C from a received discovery request to a discovery reply. When receiving a discovery reply containing application instance data, agent discovery service 202 passes data block 300C back to the application.

In some examples, during the construction of data block 300A, agent discovery service 202 organizes the data to occupy data field 306 into bytes. Referring to FIG. 1, network management service 190 on server 106, incorporating features of agent discovery service 202, builds data block 300A (FIG. 3A) containing a request for information from client 102, for example. Network management service 190 uses macros to organize or "pack" data within data field 306 as bytes. After client 102 receives datagram 300, network management service 150 uses macros to reorganize or "unpack" the data in data field 306 into a format readable by hardware included in client 102. The data contained in data field 306 is uniformly organized so that it may be interpreted by any operating system and stored in any memory configuration. Organizing the data into bytes allows agent discovery service 202 to be easily ported to new systems by simply writing new macros to pack and unpack the data contained in data field 306 of data block 300A. In some examples, the "packing" and "unpacking" of data in data field 306 could occur whether data block 300A is broadcast on a network or sent to an individual network device by a point-to-point protocol. In other examples, other components of network management service 200 could use this technique to address similar compatibility issues.

Network management service 200 may be implemented on large networks possibly including thousands of networked devices. Almost all of these will use agent discovery service 202 to continuously listen for discovery requests (e.g., PING packets) and prepare replies when such requests are received. In contrast, very few network devices will use agent discovery service 202 to discover other network devices. Thus, reducing the resources used by agent discovery service 202 to perform listening and reply functions could result in significant conservation of computing resources across an entire network. In some examples, agent discovery service 202 includes one or more dynamically loaded modules that can be hosted by an application that is an up-and-running service on a network device connected to a network. In one example, the modules could be dynamic-link libraries.

Figure 4:
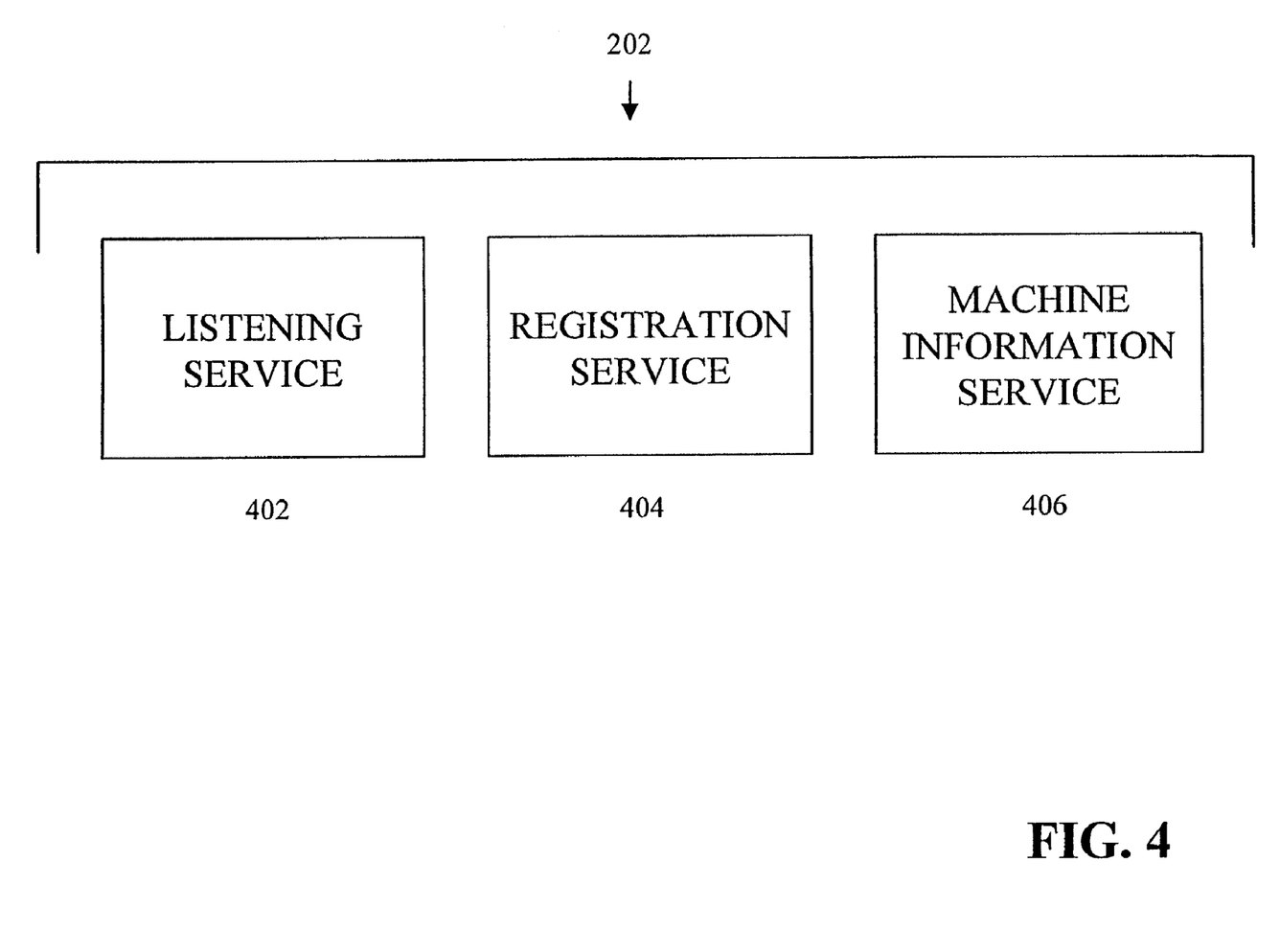
FIG. 4 is a block diagram for the operation of a network management service as a hosted application.

In some examples, agent discovery service 202 could include three dynamically loaded modules as shown in FIG. 4: listening service 402, machine information service 404 and registration service 406.

Explained in the context of network 100 (FIG. 1), listening service 402, incorporated in network management service 150, is loaded into a machine-readable medium, such as the RAM of a client 102 according to the method described in more detail below. Listening service 402 "listens" on a well-known port for PING requests sent from applications seeking to discover the local network device or agents operative on it, such as network management service 190, for example. Listening service 402 could also listen for registration requests from client application 120 made when it wants to be discoverable.

In some examples, listening service 402 could also include a feature for forwarding discovery requests to local applications. Listening service 402 could receive a PING packet requesting information about a local application, such as client application 120 for example. Listening service 402 could forward the packet to client application 120 along with a reply address so that client application 120 may respond with information about itself. The information may be kept current by autonomous acts of client application 120 or, alternatively, client application could update the information only when it receives a forwarded discovery request.

Registration service 404 could contain functions and applications needed by local applications in order to register with listening service 402. For example, client application 120 could host registration service 404 to gather specific information about itself. Client application could then provide the information to listening service 402, and unload registration service 404 to conserve computing resources.

In some examples, machine information service 406 could collect information about the local network device on which it is running, such as client 102 for example. Listening service 402 could load machine information service 406 as soon as possible to gather machine-specific information that could then be included in any discovery response. In one example, the machine specific information is included in all discovery responses. The network management service described in the '116 patent gathered a limited amount of information about the machine on which it is running, the breadth and depth of which machine information service 406 expands upon. For example, machine information service 406 could gather information about one or more network cards connecting the device to a network medium, including an IP address, subnet mask, and media access control (MAC) address for each connecting network card. Machine information service 406 could also collect, for example, the names of the applications present on client 102. Machine information service 406 could identify the protocols supported by client 102 that allow communication between a user and a remote application. Machine information service 406 could also collect monotonically increasing versions of the applications present on a networked device. The application version tells a discovering application what data is necessary to communicate with the local application. Machine information service 406 could collect information about operating system 130, including version information and any patches, for example. In another example, machine information service 406 could create a unique identifier for the local network device and reply to discovering application with the identifier. The code that is used to gather this information is comparatively large because of the number of system functions that are included. Thus, conservation of significant computing resources could be realized by using a dynamically loaded module to collect this information—if the dynamic module is unloaded and removed from memory after the needed machine information has been obtained.

For operating systems that provide protocol hosting services, such as the inetd daemon of the Unix and Linux operating systems, agent discovery service 202 can be implemented using the appropriate interfaces, such as, for example, an executable that uses stdin/stdout. In this example, the computing resources necessary for network management service 200 are even further reduced, as the code for the agent discovery service 202 is only resident in random access memory when a received discovery packet is being processed. When not processing a received packet, only the entries in the inetd's tables are resident.

In other examples, file transfer service 204, remote execution service 206, or both could implement the use of dynamic-link libraries to conserve networked computing resources when not in use.

Figure 5:
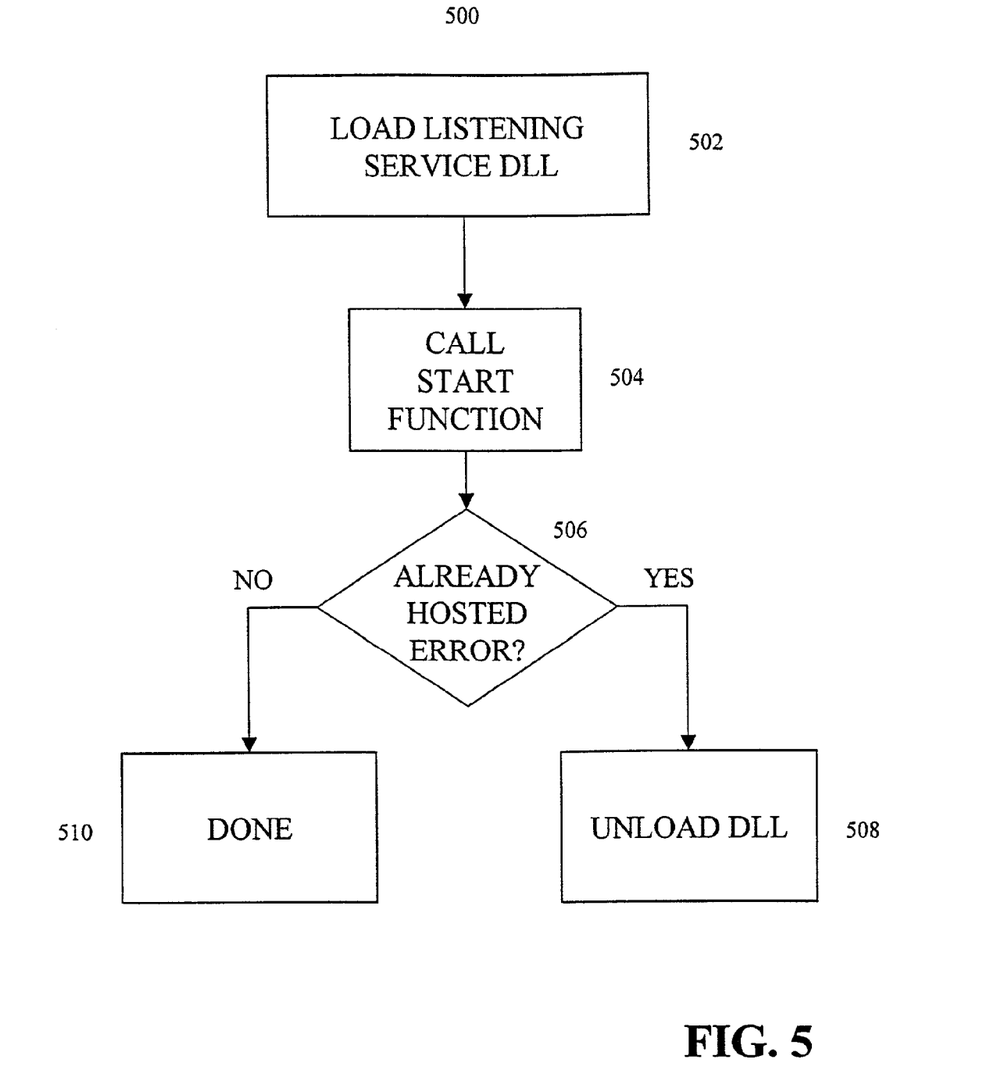
FIG. 5 is a flow chart for determining when the agent discovery service loaded by a host service should remain loaded.

In some examples, listening service 402 could operate according to the method 500, shown in FIG. 5. Listening service 402 must be loaded and running at all times if a networked device is to be discovered. However, preventing the loading of multiple instances of listening service 402 is necessary to conserve computing resources. Explained in the context of example network 100 (FIG. 1), method 500 begins with operating system 130 loading client application 120, which requires one or more of the services of listening service 402. Client application 120 dynamically loads the module into a machine-readable medium, such as random access memory (RAM) that implements listening service 402, step 502. Client application 120 then calls the start function for listening service 402, step 504. The start function checks to see if listening service 402 is hosted by any other service or application on client 102. If it is not already hosted, the start function returns a "successful" status and client application 120 must keep listening service 402 loaded in memory. Alternatively, the start function could return an "already hosted" error message if listening service 402 is hosted by another service or application. On client 102, client application 120 checks the return from the start function for an "already hosted" error at step 506. If the already hosted error is returned, client application 120 unloads listening service 402 for the purpose of freeing up the computing resources of client 106, step 508. If, instead, the start function does not return an already hosted error, listening service 402 remains loaded at step 510.

Typical agent discovery services broadcast packets of information across a network to discover agents residing on remote network devices. When a discovery packet is sent out in the form of a broadcast or directed broadcast, it is possible that hundreds or thousands of remote network devices might reply at nearly the same time. Because the reply to a discovery request sent by some agent discovery services, including agent discovery service 202, could be a connectionless user datagram protocol (UDP) packet, there is a good chance some reply packets will be discarded at various points in the network infrastructure before they reach the discovering application.

Figure 6:
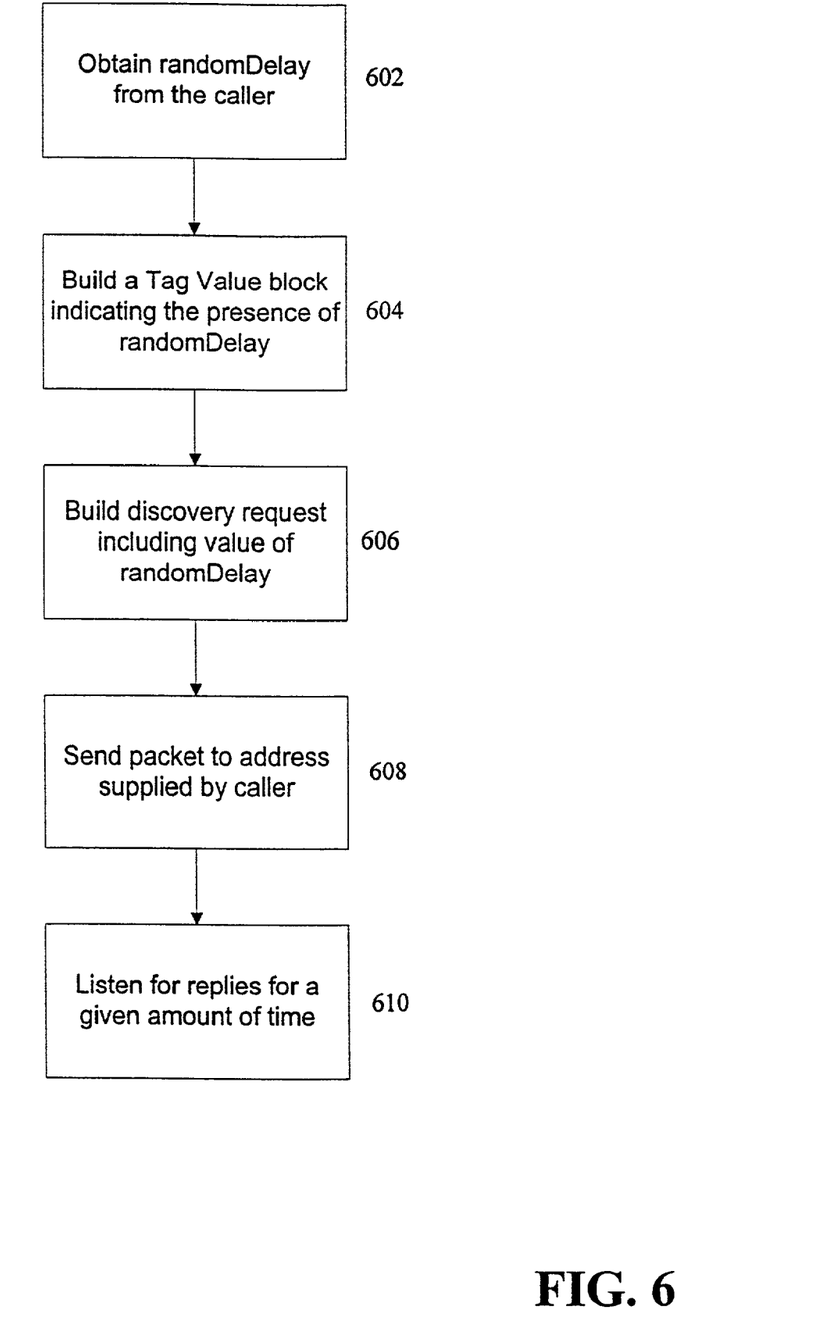
FIG. 6 is a flow chart for a method of including a random delay value in a packet of data.

In some examples, agent discovery service 202 employs a technique to evenly distribute the receipt of discovery replies from remote agents over time. One such technique could be the method shown in FIGS. 6 and 7. In one example, network management service 190, incorporating possible features of agent discovery service 202 wants to discover devices operative on network 100. Network management service 190 could prompt agent discovery service 202 to broadcast discovery packets containing an instruction for discovered agents to delay their reply by a random amount of time not to exceed a maximum delay time. For reference, the maximum delay time will be referred to as "randomDelay." Network management service 190 could prompt a user for the randomDelay value or, alternatively, the value could be coded into network management service 190, step 602. When building a broadcast discovery packet (e.g., data block 300), network management service 190 builds tag 302 with a value identifying data 306 as containing randomDelay, step 604. Network management service 190 continues by building the discovery request containing the value of randomDelay within data field 306, step 606. The discovery packet is then broadcast across network 100, step 608, and network management service 190 listens for replies. For a given amount of time, step 610.

Figure 7:
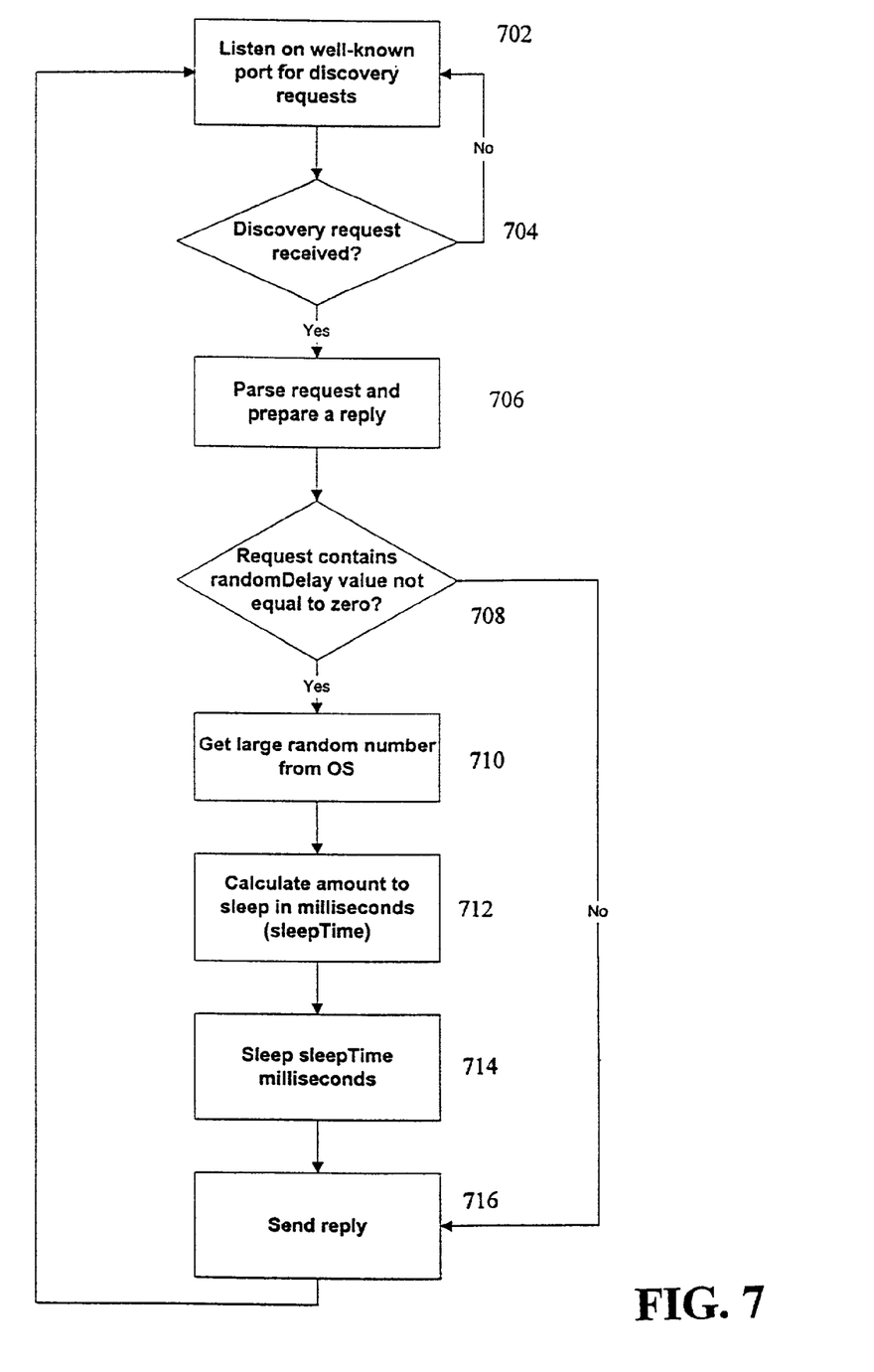
FIG. 7 is a flow chart for a method of delaying sending a reply message.

In one example, network management service 150, incorporating possible features of agent discovery service 202, listens on a well-known port for discovery requests, step 702. If no discovery requests are received, network management service 150 continues to listen on the well-known port for discovery requests, step 704. If network management service 150 receives a discovery request in the form of a datagram containing a data block 300A and tag field 302 contains a known code, network management service 150 proceeds to step 706 and parses the request and prepares a reply. If network management service 150 determines that the request does not contain a tag indicating the presence of randomDelay or randomDelay is equal to zero, step 708, network management service 150 proceeds to step 716 and sends the reply to server 190. For random reply maximum values that are nonzero, network management service 150 calculates "sleepTime" as the time to delay its reply. Network management service 190 gets a large random number from operating system 170 (step 710), for example, using a GetTickCount call, which returns a value, referred to as "TickCount", representing the number of milliseconds since client 106 last booted up. Alternatively a random number generator, like the rand() standard C function, can be used to obtain the random number. Network management service 150 then produces a random number for the reply delay, step 712, referred to as sleepTime, using the random number in the following formula:

$$\text{sleepTime} = (\text{Random Number}) \bmod (\text{randomDelay}) \quad (1)$$

The modulo function performs a simple division of randomDelay into the random number and returns the remainder of that division. Client 106 then sleeps for sleepTime milliseconds, step 714, and finishes by sending the reply back to client 102, step 716.

Other embodiments are within the scope of the following claims.

What is claimed is:

1. A method comprising:
   discovering agents operative on devices in a network by broadcasting discovery messages to network devices, the discovery messages having a first portion with a first common format and second portion containing data, the first portion identifying a type of the data contained in the second portion of the discovery message, wherein the discovery messages include tags indicating that reply messages are to be delayed by random amounts of time;
   receiving the reply messages from the agents, the reply messages having a first portion with a second common format and a second portion containing data, the first portion identifying a type of the data contained in the second portion of the reply message; and
   at least one of the first and the second common formats being configured to permit the inclusion of unknown types of data within the messages without changing the at least one format.

2. The method of claim 1 further comprising transferring files to and from the network devices by sending and receiving file transfer messages having at least one of the first and the second common format.

3. The method of claim 1 further comprising executing an application on a remote network device by sending to the remote network device an execution message having the first common format.

4. The method of claim 1 further comprising maintaining a list of codes for identifying the different messages.

5. The method of claim 4 further comprising using the list of codes for identifying the types of data.

6. The method of claim 1 wherein at least one of the first and the second common format comprises a first data block.

7. The method of claim 6 wherein the data block comprises an identifier field configured to contain an identifier tag.

8. The method of claim 7 wherein the identifier tag comprises a four byte code.

9. The method of claim 6 wherein the data block comprises a size field configured to contain description of the size of the data.

10. The method of claim 9 wherein the size description comprises a two byte number.

11. The method of claim 6 wherein the data block contains a data field configured to contain data.

12. The method of claim 11 further comprising nesting a second data block within the data field of the first data block.

13. The method of claim 1 further comprising:
including instance data in the discovery messages configured to identify the discovery request;
at the remote network devices, copying the instance data into the reply message; and
matching a reply message to the originating discovery request by identifying the instance data within the reply message.

14. The method of claim 1 further comprising:
receiving application instance data from an application;
including the application instance data in the discovery message;
at the remote network devices, copying the application instance data into the reply messages; and
passing the application instance data from the reply message to the application.

15. The method of claim 1 wherein broadcasting the discovery messages comprises broadcasting the discovery messages in a directed broadcast.

16. The method of claim 1 wherein broadcasting discovery messages comprises:
adding a new code to a collection of known codes that are each associated with a type of data; and
broadcasting a first discovery message having a first portion that uses the new code to identify the type of the data contained in the second portion of the first discovery message.

17. The method of claim 1 wherein receiving reply messages comprises:
receiving a first reply message;
comparing the first portion of the first reply message with codes in a collection that are each associated with a type of data; and
in response to determining that the first portion does not include a code in the collection, ignoring the second portion of the first reply message.

18. The method of claim 1 wherein broadcasting discovery messages comprises:
transmitting a first discovery message having a first portion that identifies a command contained in the second portion of the discovery message.

19. The method of claim 1 wherein at least one of the first and the second common formats is configured to permit the inclusion of unknown commands within the messages without changing the at least one format.

20. The method of claim 1, wherein broadcasting the discovery messages comprises broadcasting the discovery messages using a connectionless protocol.

21. The method of claim 1 further comprising, at the agents on the devices in the network, receiving the discovery messages, determining that the discovery messages include tags indicating that reply messages are to be delayed by random amounts of time, selecting the random amounts of time, and delaying sending the reply messages by the random amounts of time.

22. A method comprising:
packing data within a message configured to be read by remote agents in a network of devices, the data being organized without regard to data formats and data alignment standards of the devices or operating systems of the devices;
broadcasting the message on the network to multiple remote agents;
receiving the message at the remote agents; and
at a specific remote agent, receiving the message, organizing data within the message in accordance with a specific data format and data alignment standard of a specific device and operating system, determining that the message includes a tag indicating that the reply is to be delayed by a randomly selected amount of time, randomly selecting the amount of time, and delaying sending a reply to the message by the randomly selected amount of time.

23. The method of claim 22 wherein the data within the message configured to be read by the remote agents is packed using a macro.

24. The method of claim 22 wherein the data is organized by macros at the specific remote agent.

25. The method of claim 22 wherein the broadcast message comprises a discovery message.

26. The method of claim 25 further comprising receiving messages from the remote agents, wherein the received messages comprise reply messages.

27. The method of claim 26 wherein the broadcast and received messages comprise file transfer messages.

28. The method of claim 22, wherein broadcasting the message comprises broadcasting the message using a connectionless protocol.

29. A method comprising:
discovering remote agents operative on remote network devices by broadcasting discovery messages from a local network device to the remote network devices and receiving reply messages from the agents, wherein the discovery messages include tags indicating that reply messages are to be delayed by random amounts of time;
at a remote network device, after receipt of a discovery message, forwarding the message to an application o the remote network device; and
in response to the forwarded discovery message, randomly selecting an amount of time and delaying sending a reply message configured to contain information about the application to the local network device by the randomly selected amount of time.

30. The method of claim 29 wherein the application gathers the information only upon the receipt of a discovery message.

31. The method of claim 29 where the discovery message is sent to a single remote device using a point-to-point protocol.

32. The method, of claim 29, wherein discovering remote agents comprises broadcasting the discovery messages using a connectionless protocol.

33. An article comprising a machine-readable medium which stores instructions that execute:
a listening module of an agent discovery service to listen for discovery requests at a device in a network of devices;

a collection module of the agent discovery service for collecting information about the device to be included in response to discovery requests;

a registration module of the agent discovery service fro registering applications operative on the device that want to be discovered;

a tag recognition module of the agent discovery service for determining that discovery requests include tags indicating that the replies are to be delayed by random amounts of time; and a time selection module of the agents discovery service for selecting the random amounts of time by which replies to the discovery requests are to be delayed;

wherein one or more of the modules of the agent discovery serve are configured to be hosted by an application operative on the device.

34. The article of claim 33 wherein the article is a dynamic library or system object.

35. The article of claim 33 wherein the collection module permits collection of information about more than one network card for a device.

36. The article of claim 33 wherein the collection module collects the internet protocol address, subnet mask, and Media Access Control address for any network card operative on the device.

37. The article of claim 33 wherein the collection module collects the subnet mask associated with each IP address for the device, application names, protocols supported, monotonically increasing application versions, and machine unique identifier information.

38. The article of claim 33 wherein the agent discovery service permits a remote agent to send application specific reply data of variable length.

39. An article comprising:

a machine-readable medium which stores machine-executable instructions, the instructions being operable to cause a machine to:

discover agents operative on devices in a network by broadcasting discovery messages to the network devices, the discovery messages having a first portion with a first common format and a second portion containing data, the first portion identifying a type of the data contained in the second portion of the discovery message, wherein the discovery messages include tags indicating that reply messages are to be delayed by random amounts of time; and receive the reply messages from the agents, the reply messages having a first portion with a second common format and a second portion containing data, the first portion identifying a type of the data contained in the second portion of the reply message; and wherein at least one of the first and the second common formats is configured to permit the inclusion of unknown types of data within the messages without changing the at least one format.

40. The article of claim 39 further comprising instructions causing a machine to transfer files to and from the network devices by sending and receiving files transfer messages having at least one of the first and the second common formats.

41. The article of claim 39, wherein the instructions are operable to cause a machine to broadcast the discovery messages using a connectionless protocol.

* * * * *